April 21, 1970     E. E. DEVERS     3,507,381
APPARATUS FOR ADVANCING AND ROTATING ARTICLES
Filed Feb. 6, 1968
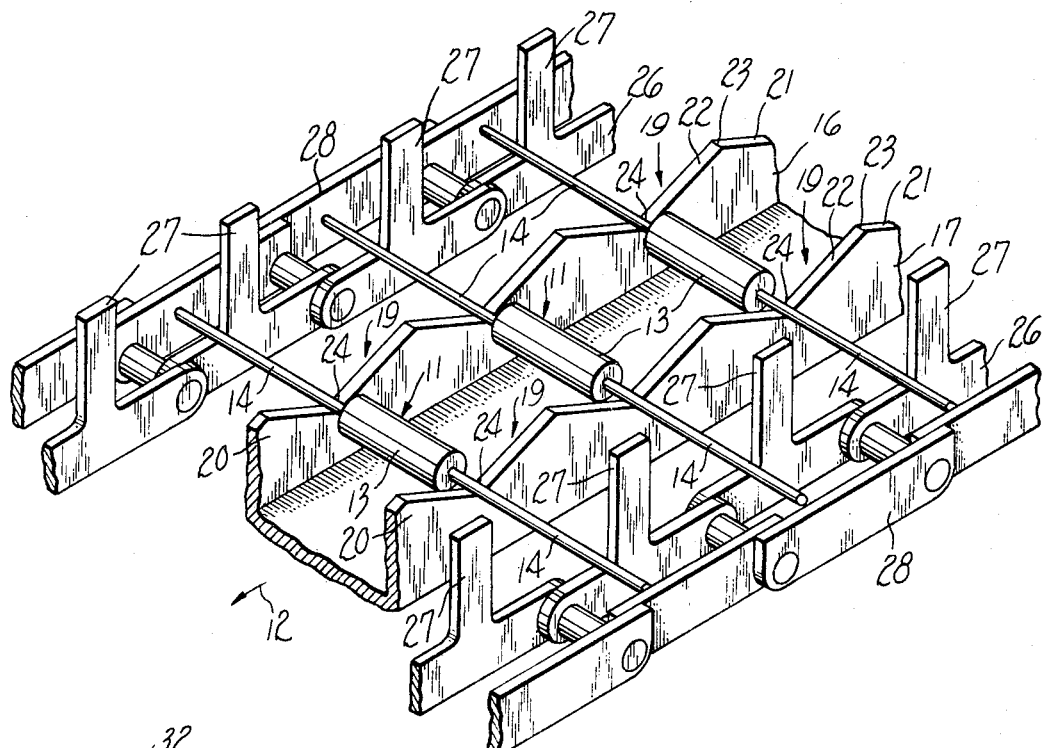
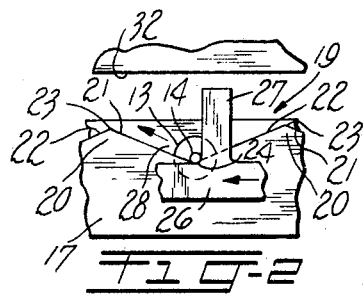
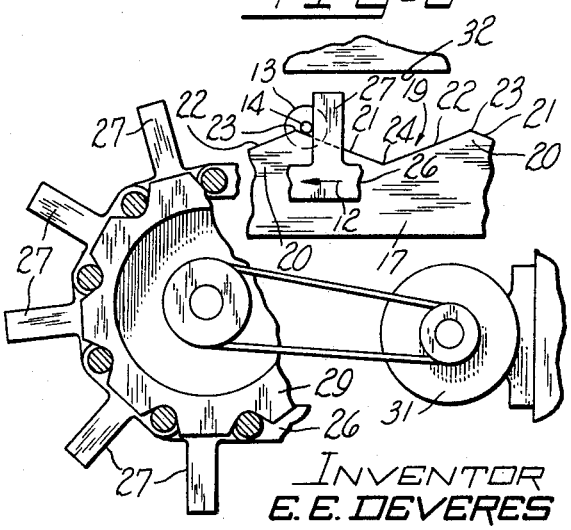
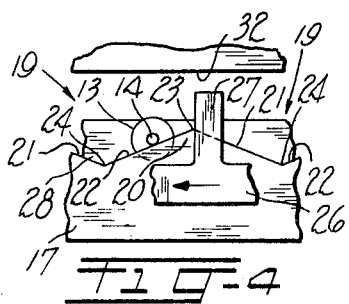
INVENTOR
E. E. DEVERES
By R. P. Miller
ATTORNEY United States Patent Office 3,507,381
Patented Apr. 21, 1970

3,507,381
APPARATUS FOR ADVANCING AND ROTATING ARTICLES
Ernest E. Deveres, Lowell, Mass., assignor to Western Electric Company, Incorporated, New York, N.Y., a Corporation of New York
Filed Feb. 6, 1968, Ser. No. 703,383
Int. Cl. B65g *19/00*
U.S. Cl. 198—173       4 Claims

ABSTRACT OF THE DISCLOSURE

Article advancing and rotating apparatus includes a pair of generally parallel horizontal rails extending through a treating zone. Serrated top surfaces of the rails define upwardly and downwardly inclined slopes for supporting leads projecting axially from component bodies. A pair of chains is advanced continuously and lugs extending from the chains engage the leads at either end of a component to push the leads up the upwardly inclined slopes. The leads roll freely ahead of the lugs on the downwardly inclined slopes to rotate the components within the treating zone.

BACKGROUND OF THE INVENTION

This invention relates to apparatus for conveying articles and, more particularly, to apparatus for advancing and rotating articles simultaneously, for example during treating of the articles.

In treating articles, such as in curing axially leaded and encapsulated electrical components, it is often desirable to continually rotate the articles about a substantially horizontal axis. In the particular case of curing encapsulated components, such rotation permits the curing process to occur uniformly in an encapsulating heated epoxy resin or other coating while avoiding any running of the hot, soft coating down the sides of the component which might occur in nonrotated components. Additionally, the rotation successively presents plural surfaces of an article or component to various treating mechanisms, such as a heating lamp positioned above the articles, so that all such surfaces are treated with substantial uniformity.

It is known to rotate articles while conveying the articles through a zone wherein the articles are treated. Apparatus heretofore used to provide such combined translation and rotation has generally been complex. Such apparatus may either include plural drive trains, or rely upon reaction between a stationary member and a special article carrier to provide a rotational drive upon translation of the article carrier, for simultaneously advancing and rotating the articles.

SUMMARY OF THE INVENTION

An object of the invention resides in new and improved apparatus for advancing and rotating articles, such as encapsulated or coated electrical components having axially extending leads. A simple, reliable apparatus of this type is provided by the invention through the use of a rail-like support having a notched upper surface defining upwardly and downwardly inclined slopes, in combination with a continuously advanced mechanism for moving the articles up the upwardly inclined slopes so that the articles may roll freely down the downwardly inclined slopes ahead of the article moving mechanism. A single drive train, including a chain with article engaging cogs or lugs, is used, this providing translatory movement to advance the article up the slopes, whereafter the articles roll down the slopes ahead of the advancing cogs. No special article carrier is required. The apparatus instead acts directly upon the articles in advancing them into position to roll downwardly and thereby to be rotated. The apparatus reliably performs its required function, yet is of an extremely simple nature.

While the principles of the invention are applicable to the advancing and rotating of articles of many varied types and configurations, a preferred embodiment is described hereinafter. The described embodiment is particularly suited to translating and rotating components or other articles which have central body portions with leads or projections extending axially from each end thereof. This embodiment is adapted to perform the twin functions of advancing and rotating the components without engaging the body portions of the components. The described embodiment is operable on components with bent leads, not extending in a true axial direction, as well as on components with unbent, axially extending leads.

BRIEF DESCRIPTION OF THE DRAWING

FIG. 1 is an isometric view of an apparatus for advancing and rotating articles, constructed in accordance with the invention; and FIGS. 2, 3 and 4 are side elevational views of a portion of the apparatus shown in FIG. 1, those views illustrating successive positions of an article on a support and of an article moving mechanism during the operation of the apparatus depicted in FIG. 1.

DETAILED DESCRIPTION

Referring to FIG. 1, exemplary apparatus, incorporating the principles of the invention, is shown for rotating articles such as the components 11 while moving them, e.g., during a treating operation, in a forward direction, shown for purposes of illustration by arrow 12. Each of the components 11 is composed of a cylindrical body portion 13 and a pair of projecting, generally cylindrical leads 14, 14, one extending axially outwardly at each end of the body portion 13. The articles may alternatively be other objects having various shapes, with projecting elements similar to the generally cylindrical leads 14 constituting a part of the articles or being joined thereto or formed thereon for use during treatment.

The components 11 are shown supported by their leads 14 resting on a pair of substantially parallel, upwardly extending legs or rail portions 16 and 17 of a generally horizontally extending U-shaped channel member 18. The U-shaped channel member 18 may constitute a forwardly extending continuation of a U-shaped channel member or trough, disclosed in D. A. Estabrooks application Ser. No. 439,176, filed Mar. 12, 1965, concerning a Method of and Apparatus for Coating Articles and the Product Resulting Therefrom. The U-shaped channel member or trough is designated in the D. A. Estabrooks application by the reference numeral 24.

The above-identified D. A. Estabrooks application relates to apparatus for depositing particles of an epoxy resin upon a succession of components, namely heated wire-wound resistors, while advancing the resistors by moving their leads across the U-shaped channel member wherein there is contained epoxy powder flowing along the channel under the influence of a vibrator. During contact between the fluidized epoxy powder and the bottom surfaces of the body portions of the resistors, the resistors are rotated as they are advanced, to form a uniform coating on the heated body portions. The epoxy-covered bodies of the components must then be treated by a curing process, while being maintained free from contact with any supporting apparatus, to form on the component bodies a hardened epoxy coating, resistant to chipping and/or peeling.

The present invention contemplates the provision of facilities in a treating or curing zone for rotating the epoxy-covered resistors or other articles during curing or other treatment. The rails 16 and 17, which support the component leads or projections 14 without engaging the component bodies 13, extend through a curing zone. If the Estabrooks coating apparatus is used, with the U-shaped channel member 18 constituting an extension of a similar member of the coating apparatus, an opening for discharging the epoxy powder would, of course, be present in the channel member between coating and curing zones of the combined apparatus.

The rails 16 and 17 may, of course, be formed by generally horizontally extending members other than the upwardly extending legs of a horizontal, U-shaped channel member. For example, the rails 16 and 17 might be horizontally extending tracks or the horizontal upper edges of vertically extending plates. Such tracks or plates may have any desired vertical dimension, with bottom surfaces of any shape. They are preferably no more wide than necessary to support the component leads or projections 14, so as not to interfere with rolling of bent leads. The term "rails," as used herein, should be taken to include any generally horizontally extending members capable of supporting articles such as by carrying thereon axially projecting portions thereof.

Each of the rails 16 and 17 has a serrated upper surface for supporting axially projecting portions of articles, such as the leads 14 of the components 11. This serrated upper surface is formed by the presence of a plurality of V-shaped notches 19 extending down into the rails 16 and 17. The notches 19 define a plurality of saw teeth 20 having upwardly inclined slopes 21 and downwardly inclined slopes 22 over which the leads 14 of a component 11 are to travel in being advanced in the forward direction shown by the arrow 12. An apex 23 is formed where the forward end of each upwardly inclined slope 21 meets the rearward end of an adjacent downwardly inclined slope 22. A valley 24 is formed where the forward end of each downwardly inclined slope 22 meets the rearward end of an adjacent upwardly inclined slope 21.

In order to move the leads 14 of the components 11 up the slopes 21 in the forward direction illustrated by the arrow 12, a pair of conveyor chains 26, 26 is provided. Each of the chains has a plurality of transverse projections constituting cogs or lugs 27 extending upwardly for engaging the leads 14. Adjacent lugs 27 are spaced apart in a longitudinal direction by a distance substantially greater than the thickness of the leads, in order to provide a sizable clearance within which the leads 14 may roll freely down the slopes 22 after being advanced across the apex 23 of each saw tooth 20. Each conveyor chain 26 preferably has mounted axially outwardly thereof a side bar 28 for confining the leads 14 axially upon contact therewith of the axially outward ends of the leads. Thus, axial displacement of the components 11 may be limited into a narrow zone so as to avoid any contact between the ends of the component bodies 13 and the rails 16 and 17 during curing. Such contact would be injurious to the hot, soft coating undergoing curing, as well as tending to prevent rotation of the components. The side bars 28 may be stationary frame members or may constitute a plurality of links mounted to axially outward portions of the chains 26 to move with the chains. The side bars 28 must be so located and of such height that the leads 14, even if bent will be aligned therewith at all vertical positions of the leads on the slopes 21 and 22, including the apexes 23 and the valleys 24, as may be seen in FIG. 2 with respect to the far side bar 28.

Sprocket wheels 29 (one partially shown in FIG. 3) and a drive train operated by a motor 31 are utilized to provide continuous movement to both chains 26 at equal predetermined speeds in a forward direction. The chain 26 is preferably driven at a speed that allows the rolling leads to move away from the projecting lugs 27, after a pair of leads 14, 14 on a component have been advanced over each apex 23. Thus, the speed at which chain 26 is driven should not be so great that the lugs move at a faster rate than that at which an article 11, rolling forward under the influence of gravity, will accelerate on the downwardly inclined slopes 22. This rate is easily calculable for a known angle of the slopes 23 and a known coefficient of friction between the leads 14 and the surface of the slopes 22. The advance of the rolling leads 14 down the slopes 22 faster than the advance of the chain 26 permits the leads to roll naturally, unencumbered by contact with the forward surfaces of the trailing lugs 27.

In describing the operation of the exemplary apparatus shown in FIG. 1, reference is now also made to FIGS. 2–4. FIGS. 2–4 include a heating lamp 32, representative of any appropriate treating facilities for heating, spray coating, etc. The apparatus is assumed to be initially in the condition illustrated in FIG. 1, i.e., with the components previously advanced so that each pair of leads 14 is positioned in the valleys 24 of the V-notches 19 and with each pair of projecting lugs 27 on the continuously advanced chain 26 about to engage a pair of leads.

FIG. 2 shows the forward surface of a lug 27 coming into engagement with a lead 14. Further advance of the lug, as movement of the chains 26 continues, causes the lead-engaging forward surface of the lug to push the lead up the slope 21 to approach the apex 23 of a saw tooth 20, as shown in FIG. 3.

Once the lead 14 has been moved across the apex 23 by the lug 27, the component 11 is free to roll forward with each lead 14 rolling down a slope 22 on a rail 16 or 17 due to the influence of gravity, as shown in FIG. 4. Each lead 14 rolls freely down the associated slope 22 ahead of the forward surface of the associated trailing lug 27 within the clearance between this projection 27 and an adjacent lug 27 forward of the lead 14. Such free rolling is permitted by a correct selection of the speed of advance of the chain 26, driven from the motor 31, as explained above.

Preferably, the clearance between neighboring projections 27 and the angles of the downwardly inclined slopes 22 are interrelated with the speed of advance of the chains 26 such that the lead 14 rolls ahead of the forward edge of a trailing lug 27 located rearwardly thereof, without contacting the rearward edge of a leading lug 27 located forwardly thereof, while rolling down the slope 22. Thus, the rotation of the leads 14 on each slope 22 and, therefore, of the components 11 is not impeded, nor are the leads forceably advanced on the slopes 22, by contact with the adjacent lugs 27. This requirement would, of course, necessitate both an appropriately altered spacing for the lugs 27 projecting from a chain 26, changing the size of a clearance zone between adjacent lugs, and a steepening of the downwardly inclined slopes 22, where it is desired that the articles 11 be advanced at a faster rate and the speed of the chain be increased. The angle of the upwardly inclined slopes 21 might also be altered, as desired. Additionally, the slopes 21 and 22 may be rounded off in a sinusoidal or other suitable shape. As used herein, the terms "notched" and "serrated" are intended to be descriptive of any intended or otherwise non-planar surface defining a plurality of generally upwardly inclined slopes and a plurality of generally downwardly inclined slopes of any suitable steepness.

It is desirable that the apparatus function to rotate the components 11 even where the leads 14 are bent somewhat away from a true axial configuration, typically to an extent up to and including the radius of the component body 13. Naturally, such bent leads are displaced from the axis of the component bodies to a greater extent at axially outwardmost portions of the leads. Moreover, the leads tend to bend in cantilever fashion, such that the radial displacement of a lead 14 from the axis of a component body 13 is negligible at the portion of the lead closest to the component body. Therefore, the rails 16 and 17 are preferably so positioned that they closely surround the edges of the component bodies 13 without touching the bodies. Thus, any tendency of a bent portion of the lead to bind against rotation is minimized and the radial displacement of the supported lead portion from the center of gravity of the component is made negligible. As a result, a component 11 with a bent lead 14 will roll down the slopes 22 due to the kinetic and potential energy present in the component when pushed over the apex 23 of a saw tooth 20. The rails are narrow enough that axially outward portions of the bent leads 14 do not bind against the rails 16 and 17 to prevent rolling. Additionally, the chains 26 are preferably located close enough to the rails so that axially outward portions of the rolling, bent leads do not contact the lead or trailing lugs 27. The positioning of the lead-confining side bars 28 is cooperative with that of the rails 16 and 17 such that the component bodies 13 never contact the rails during curing.

The rolling of a component 11, due to the free rolling of the leads 14 down the slopes 22 within the clearance zone between neighboring projecting lugs 27, provides the desired rotation during curing. Thus, any running of hot, soft resin down to an underside of a component 11 is prevented. Also, all external surfaces of the component body 13 are successively presented to the heating lamp 32 or other treating facilities. It is possible that some rotation of the components 11 may occur during the pushing of the component leads up the slopes 21 by the lugs 27. A tendency toward such rotation is caused by frictional contact between each lead and the surface of a slope 21, providing a reaction force at an edge of the lead. This effect may be sufficient to overcome the tendency of the lead 14 not to rotate, due to contact with the lug 27 while the lead is on the slope 21. The free rolling of the leads 14 on the downwardly inclined slopes 22, however, assures that some rotation of the components will occur. Moreover, due to the close spacing of the rails 16 and 17, it is likely that even where a lead is badly bent, some rotary oscillation through part of a revolution will occur on the downwardly inclined slopes 22 even if continuous rolling does not occur. The associated lug 27 will then push the partially rotated lead 14 down a portion of the slope 22.

Once all of the components 11 have rolled forward down the slopes 22, their leads will come to rest in the valleys 24 with the projections 27 continuing to advance toward reengagement with the leads. This is the condition in FIG. 1, as described above.

Operation of the apparatus continues in the aforesaid manner. Successive components 11 are, thus, advanced continuously through the entire treating zone, constituting the curing zone beneath the heating lamp 32, the components also being rotated during such advancing movement.

It is to be understood that the above-described apparatus is simply illustrative of one embodiment of the invention. Many modifications may be made without departing from the invention.

What is claimed is:

1. In apparatus for conveying an article having a pair of axially extending, generally cylindrical projections to advance the article linearly and rotate the article:
    a pair of rails each having an upper surface defining both an upwardly inclined slope and a downwardly inclined slope positioned forwardly of said upwardly inclined slope for supporting said axially extending projections; and
    means, engaging the projections of the article supported on said rails while said projections are on said upwardly inclined slope and advanced continuously forward at a speed selected to be slower than that which the projections will attain in rolling freely down said downwardly inclined slope, for pushing the projections of the components forward up said upwardly inclined slope and onto the downwardly inclined slope whereby the article rotates with the projections rolling freely down said downwardly inclined slope.

2. In apparatus for conveying an article, as set forth in claim 1, the two projections on the article extending axially outwardly at opposed ends of a central portion of the article:
    means positioned to contact the article projections along axially outward surfaces thereof for limiting axial movement of the central portion of the article to a zone wherein neither opposed end of the central portion engages either of said rails.

3. In apparatus for treating components having body portions and having leads extending axially from opposed ends of the body portions, a device for advancing and rotating the articles during treatment, which comprises:
    a pair of generally parallel rails extending through a treating zone and spaced so as to support thereon the leads of the components adjacent the body portions thereof, the rails each having a serrated top surface defining a plurality of V-shaped notches;
    a pair of side bars extending parallel to said rails and positioned axially outwardly thereof so as to confine the ends of the component leads axially therebetween;
    a pair of chains extending parallel to said rails and located axially outwardly of said rails and inwardly of said side bars, each chain having a plurality of longitudinally spaced lugs projecting transversely therefrom for confining component leads longitudinally therebetween and for pushing one lead ahead of each of said lugs in a direction of movement of said chain; and
    drive means operable at a predetermined speed for moving said chain in said direction of movement, said lugs each pushing one of the leads of a component in said direction up an upwardly inclined surface of each of said V-shaped notches and over an upper apex thereof, said predetermined speed being selected to enable the component thereupon to move forward and rotate within said treating zone with the component leads rolling freely down an adjacent downwardly inclined surface of said V-shaped notch spaced from said lugs.

4. Apparatus for conveying and rotating components, as set forth in claim 3, wherein said bars constitute a plurality of links mounted to said chains axially outwardly thereof to move with said chains, said links each being positioned and having sufficient height to engage an end of a component lead with the lead at any position on said serrated top surface of said rails.

References Cited

UNITED STATES PATENTS 2,490,206  12/1949  Calley _____ 198—33

FOREIGN PATENTS 1,088,426  9/1960  Germany.

ANDRES H. NIELSEN, Primary Examiner